No. 776,745. PATENTED DEC. 6, 1904.
S. R. KENNEDY.
CENTRIFUGAL MACHINE.
APPLICATION FILED JAN. 26, 1904.
NO MODEL.
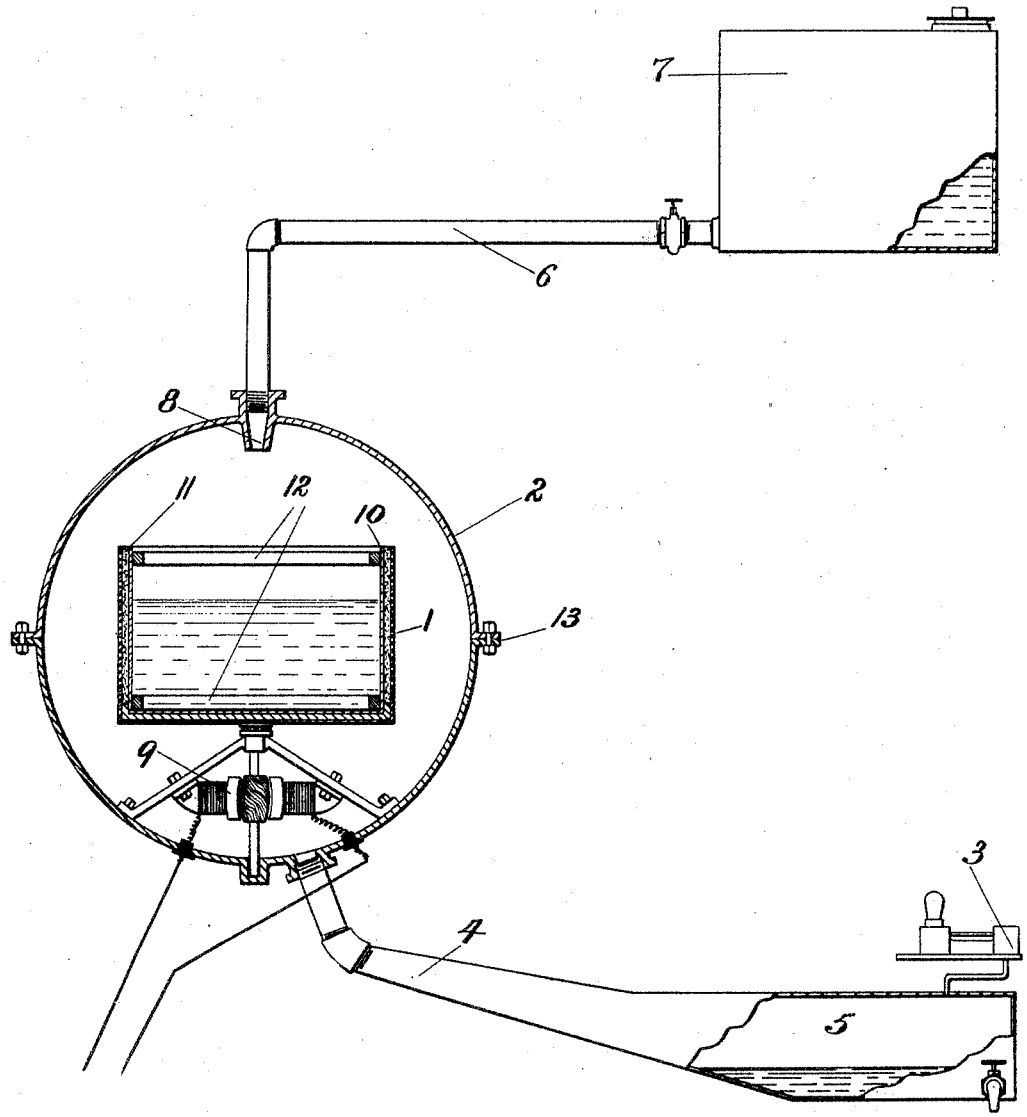
WITNESSES:
INVENTOR.
Samuel Sidgway Kennedy.
BY A. B. Stoughton
ATTORNEY.

No. 776,745. Patented December 6, 1904.

UNITED STATES PATENT OFFICE.

SAMUEL RIDGWAY KENNEDY, OF SHIPPENSBURG, PENNSYLVANIA, ASSIGNOR TO THE AMERICAN DAIRY PRODUCTS AND MANUFACTURING COMPANY, OF PHILADELPHIA, PENNSYLVANIA, A CORPORATION OF PENNSYLVANIA.

CENTRIFUGAL MACHINE.

SPECIFICATION forming part of Letters Patent No. 776,745, dated December 6, 1904.

Application filed January 26, 1904. Serial No. 190,713. (No model.)

*To all whom it may concern:*

Be it known that I, SAMUEL RIDGWAY KENNEDY, a citizen of the United States, and a resident of Shippensburg, in the county of Cumberland and State of Pennsylvania, have invented certain new and useful Improvements in Centrifugal Machines, of which the following is a specification.

Objects of the present invention are to provide for subjecting milk and milk products to the action of a centrifugal machine under conditions peculiarly adapted to effect the exclusion of air, and thus secure the absence of contamination, such as would result from the admission of undesirable ferments which are present in the atmosphere in the neighborhood of dairies and places where dairy operations are conducted.

Another object of the invention is to especially adapt a centrifugal machine to the separation of the fatty portion from the constituents of cream.

Other objects of the invention will appear from the following description.

Stated in general terms, the invention comprises the combination, with a centrifugal machine, of a vacuum-chamber inclosing or including the basket thereof. It also comprises the combination, with the basket of a centrifugal machine, of material, as blotting-paper, arranged with or without absorbent material, as toweling, in such a way as to form the walls of the basket; and the invention further comprises the improvements to be presently described and finally claimed.

The nature, characteristic features, and scope of my invention will be more fully understood from the following description, taken in connection with the accompanying drawings, forming part hereof, and in which is illustrated, principally in central section, apparatus embodying features of the invention.

In the drawing, 1 is the bowl or basket of a centrifugal machine, and its curved wall is perforated or made reticular.

2 is a chamber inclosing or including the basket or bowl 1 and closed against the outer atmosphere, and it is shown as provided with means for creating within it a more or less perfect vacuum. As shown, there is a pump 3, which serves to exhaust air from the chamber 2 by way of the outlet 4, which is shown as leading to a receptacle 5, which receives the "sling" from the machine and which is ordinarily closed.

6 is an inlet shown as provided with a valve, and it communicates with a receiving-tank 7, normally sealed to prevent admission of air, and with the chamber 2.

8 is a guide or nozzle which is useful for directing the incoming supply to the basket or bowl 1.

The receptacle 2 may be arranged so as to be opened in order to recover that portion of the "load" which remains in the basket or bowl. As shown, this is accomplished by making the parts of the chamber separable, as at 13.

9 indicates an electric motor which constitutes one means for driving the bowl or basket.

In use the load is introduced into the basket from the reservoir 7 by way of the pipe 6, and air is exhausted from the chamber 2 by means of the pump 3, acting by way of the outlet 4. Thus the material in the centrifugal is operated upon in a vacuum-chamber or one from which air is excluded, and this secures the absence of contamination by excluding undesirable ferments which are present in the air, for example, about dairies and places where dairy operations are conducted.

10 is a wall or diaphragm of material which has the property of retaining upon one of its faces the fatty constituents of milk or cream and of permitting the other constituents to pass through it. Blotting-paper is an example of such material.

11 is a layer of absorbent material, as toweling, arranged between the material 10 and the perforated wall of the basket or bowl. When cream is subjected to the action of the machine, the fatty portions remain in the basket, and the other portions escape through the wall or partition 10, and the presence of the textile material 11 enables the operation to be carried on rapidly.

12 represents retaining-rings, which serve to hold the parts 10 and 11 to place.

It will be obvious to those skilled in the art to which my invention appertains that modifications may be made in details without departing from the spirit thereof. Hence I do not limit myself to the precise construction and mode of operation of the parts hereinabove described; but,

Having thus described the nature and objects of my invention, what I claim as new, and desire to secure by Letters Patent, is—

1. The combination with a centrifugal machine of a vacuum-chamber inclosing or including the basket thereof, substantially as described.

2. The combination with a centrifugal machine of a chamber closed against the outer atmosphere inclosing or including the basket thereof, and means for exhausting air from said chamber, substantially as described.

3. The combination with a centrifugal machine of a vacuum-chamber inclosing or including the basket thereof, normally sealed admission connections to said chamber, normally sealed eduction means from said chamber, and a vacuum-pump connected with said chamber, substantially as described.

4. The combination with the perforated bowl or basket of a centrifugal machine of a layer of material adapted to retain upon its face the fatty constituents and to permit of the passage of the other constituents, and a layer of absorbent material interposed between the basket and the first-mentioned layer, substantially as described.

5. The combination with the perforated basket or bowl of a centrifugal machine of a layer of blotting-paper, an interposed layer of textile material, and retaining-rings, substantially as described.

In testimony whereof I have hereunto set my hand this 21st day of January, 1904.

SAMUEL RIDGWAY KENNEDY.

In presence of—
W. J. JACKSON,
K. M. GILLIGAN.